April 28, 1942.  C. BEVERLIN  2,281,136
ICE CREAM CONE HOLDER
Filed April 24, 1941
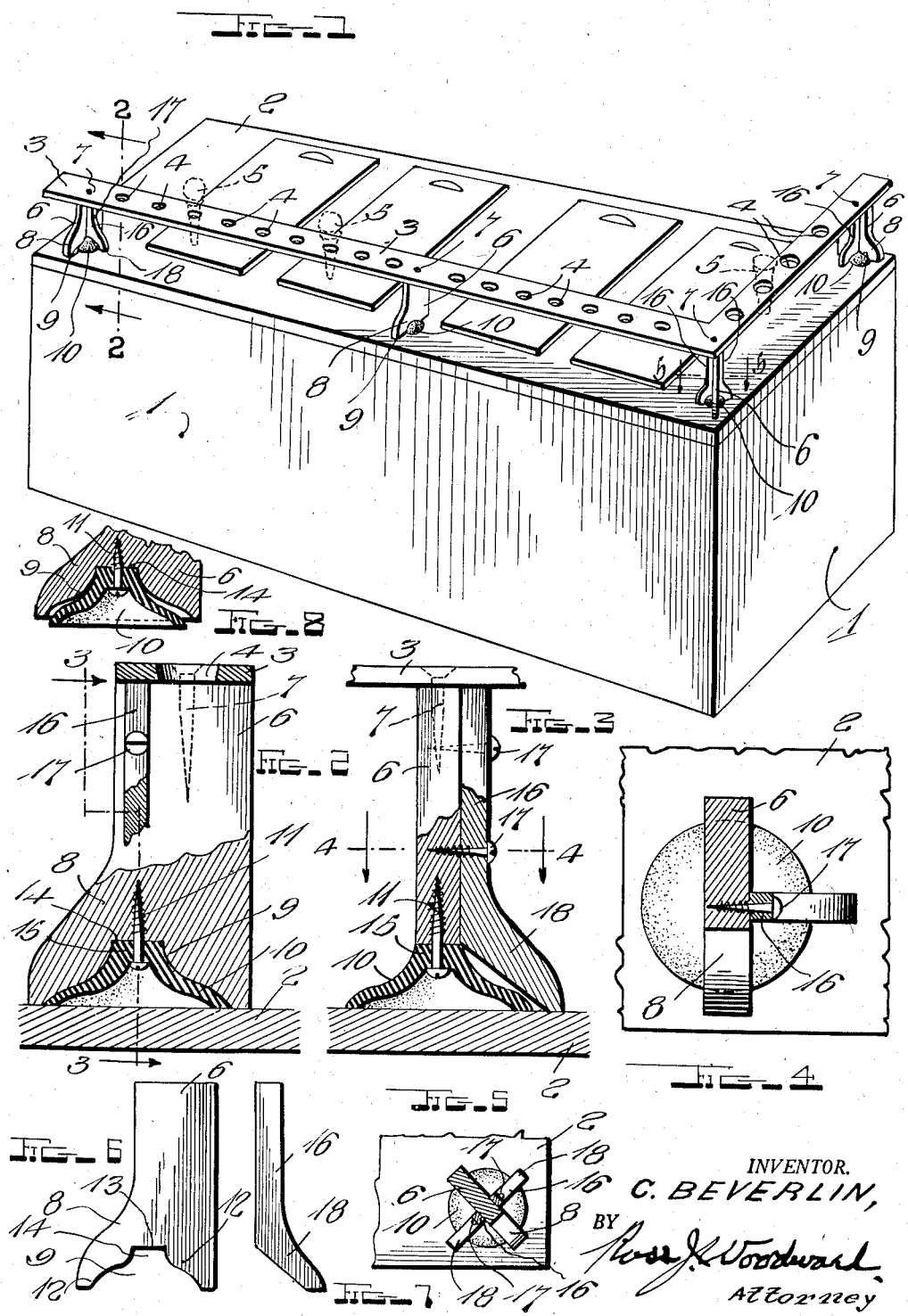
INVENTOR.
C. BEVERLIN,
BY
Attorney Patented Apr. 28, 1942

2,281,136

UNITED STATES PATENT OFFICE 2,281,136

ICE CREAM CONE HOLDER

Clifton Beverlin, Sedro Wooley, Wash.

Application April 24, 1941, Serial No. 390,169

4 Claims. (Cl. 248—362)

This invention relates to ice cream cone holders and this application constitutes a continuation in part of the co-pending application filed September 26, 1940, and bearing Serial Number 358,525.

It is one object of the invention to provide a cone holder which is adapted for use in connection with a counter or flat-topped refrigerator constituting a housing for ice cream containers.

Another object of the invention is to provide an ice cream cone holder including a strip formed with cone-receiving sockets and supporting means for the strip having vacuum cups associated therewith for gripping the surface of the counter and firmly holding the cone holder in place thereon.

Another object of the invention is to provide the cone holder with supports having their lower ends formed with recesses so formed that cups may be mounted therein and held in proper position relative to the supports.

Another object of the invention is to provide a cone holder which is strong and durable, cheap to manufacture, and attractive in appearance so that it does not detract from the appearance of a counter or refrigerator to which it is applied.

In the accompanying drawing:

Fig. 1 is a perspective view showing the improved cone holder resting on a counter.

Fig. 2 is a sectional view on the line 2—2 of Fig. 1.

Fig. 3 is a view on the line 3—3 of Fig. 2.

Fig. 4 is a transverse sectional view on the line 4—4 of Fig. 3.

Fig. 5 is a transverse sectional view on the line 5—5 of Fig. 1.

Fig. 6 is a view of one of the members forming a prop.

Fig. 7 is a view of another prop-forming member.

Fig. 8 is a view showing the position of a vacuum cup before being applied to the counter.

This improved cone holder is intended for use in connection with a counter 1 which has been shown as a storage chest or refrigerator for cans or other containers holding ice cream but may be an ordinary counter. The top 2 of the counter has a flat surface and its marginal portions are unobstructed in order that the holder may follow margins of the counter when applied thereto.

The strip 3 of the holder may be formed of wood, metal, or any other desired material and openings 4 are formed through the head strip 3 in spaced relation to each other and tapered downwardly as shown in Fig. 2 so that these openings will conform to the taper of a cone and permit cones 5 to be supported in the openings or sockets 4 with portions of the cone projecting upwardly from the head strip. Consequently, the cones may be easily grasped and lifted from the sockets.

To support the head strip in elevated position above the counter, there have been provided props 6. These props are formed of wood or other suitable material and are of such thickness that their upper ends may be secured against the under face of the head strip by screws 7 which pass through the head strip and into upper ends of the props. The lower portion of each of the supports 6 is widened outwardly to provide a wide forwardly extending foot portion 8, the support being cut from its lower end to form a recess 9 serving as a seat or pocket in which a vacuum cup 10 is secured by a screw 11. Referring to Fig. 6, it will be seen that the seat or pocket of each support tapers upwardly and has its walls 12 in the form of a reverse curve, upper ends of the walls extending longitudinally of the support in spaced relation to each other transversely thereof and, together with an upper wall 13, defining a throat 14 of dimensions to snugly receive the thick neck 15 of the vacuum cup 10. Walls of the cup conform to the curvature of the walls 12 of the recess or seat 9 but are normally spaced from these walls somewhat, as shown in Figure 8, so that when downward pressure is applied, the cup may expand and move into contact with the walls 12 as shown in Fig. 2. The cups at lower ends of the supports will then have suctional grip upon the upper surface of the counter top 2 and serve very effectively to hold the device in place thereon. Certain of the supports carry transversely extending bracing strips or webs 16 which are secured thereto by screws 17. The bracing strips extend longitudinally of the supports between their upper ends and upper walls of the throats 14 of the recesses 9, and each brace has a foot 18 which extends downwardly at an outward angle, as shown in Fig. 3, and cooperates with walls of the recess to limit spreading of the vacuum cup carried by the support to which the brace is secured. Braces may be secured against opposite side faces of the supports 6, as shown in Fig. 5, and at a corner of the head strip in Fig. 1, or a brace may be secured against only one side face of a support, as shown in Fig. 4, and at ends of the head strip in Fig. 1.

Having thus described the invention, what is claimed is:

1. In a device of the character described, a support comprising a body disposed vertically and having edge faces and side faces, said body having a recess leading from its lower end and tapered upwardly and forming the support with feet spaced from each other by the recess, walls of the recess being each in the form of a reverse curve and having their upper ends spaced from each other to provide a throat at the upper end of the recess, and a vacuum cup in the recess having a neck fitting snugly in the throat of the recess and firmly secured to the body and projecting from opposite sides thereof, the cup having walls normally spaced from walls of the recess and conforming to the contour thereof for close fitting engagement therewith when the cup is expanded by downward pressure and suction created in the cup to hold the support in place on a counter.

2. In a device of the character described, a support comprising a block disposed vertically and having edge faces and flat side faces, said block being formed with a recess leading from its lower end and tapered upwardly, bracing strips secured vertically against opposite side faces of the block between the recess and upper end of the block, said bracing strips having feet at their lower ends extending downwardly at an outward incline from the side faces of the block, and a vacuum cup mounted in the recess projecting from opposite sides of the block and having a portion extending under the feet of said bracing strips, the vacuum cup when expanded for suctional engagement with the surface upon which the support rests having its walls in contacting engagement with walls of the recesses and the inner edge faces of the seat of the braces.

3. A support for a device of the character described comprising a vertically disposed block having front and rear edge faces and opposite side faces, said block being formed with a recess leading from its lower end and providing the block with front and rear feet spaced from each other by the recess, and a vacuum cup in the recess secured to the block between upper ends of the feet, said cup projecting from opposite sides of the block and having portions contacting with inner edge faces of the feet when expanded by downward pressure for gripping engagement with a surface upon which the feet rest.

4. A support for a device of the character described comprising a vertically disposed block having front and rear edge faces and opposite side faces, said block being formed with a recess leading from its lower end and providing the block with front and rear feet spaced from each other by the recess, a bracing strip mounted vertically against a side face of the block between the recess and the upper end of the block and having a foot at its lower end extending downwardly at an outward incline from the top of the recess, and a vacuum cup in the recess secured at its center to the block at the top of the recess between upper ends of the feet, said cup projecting from opposite sides of the block and having portions overlapped by the feet of the block and the bracing strip and normally spaced from inner side edge faces of the feet, said cup having contacting engagement with the inner edge faces of the feet when subjected to downward pressure for gripping a surface upon which the feet rest.

CLIFTON BEVERLIN.